United States Patent [19]
Yauneridge

[11] 3,778,022
[45] Dec. 11, 1973

[54] VALVE
[76] Inventor: Raymond Yauneridge, 605 Cherry St., Windber, Pa. 15963
[22] Filed: Jan. 27, 1972
[21] Appl. No.: 221,331

[52] U.S. Cl. .................... 251/14, 251/31, 251/63
[51] Int. Cl. .................... F16k 31/143, F16k 1/00
[58] Field of Search .................... 251/63, 25, 31

[56] References Cited
UNITED STATES PATENTS

| | | | |
|---|---|---|---|
| 1,960,284 | 5/1934 | White | 251/63 X |
| 1,999,493 | 4/1935 | White | 251/63 |
| 2,701,704 | 2/1955 | Lawrence | 251/63 X |
| 3,004,552 | 10/1961 | Shafer | 251/63 X |
| 3,426,998 | 2/1969 | Kintner | 251/63 X |
| 3,664,305 | 5/1972 | Hart et al. | 119/72 |

Primary Examiner—Arnold Rosenthal
Attorney—Elton H. Brown et al.

[57] ABSTRACT

A valve in which a piston plug moving through a cylinder engages a seal at one end of the cylinder to prevent the flow of fluid therethrough. The opposite end of the piston is also sealed to the cylinder to prevent leakage. A cylindrical sleeve is sealed into the valve body and has an enlarged piston mounted for sealed reciprocation therein and forming part of the piston valve. Pneumatic or hydraulic pressure applied to opposite sides of the piston reciprocating in the sleeve cylinder will cause the piston valve to reciprocate to open and closed positions. In the modified form of the invention pressure is applied to one end of the reciprocating piston and a spring is provided for its return. In a further modified form of the invention a connecting rod is coupled to the piston for hand operation of the valve. All working parts of the valve can be removed for repair without disconnecting the valve body from the line.

7 Claims, 6 Drawing Figures

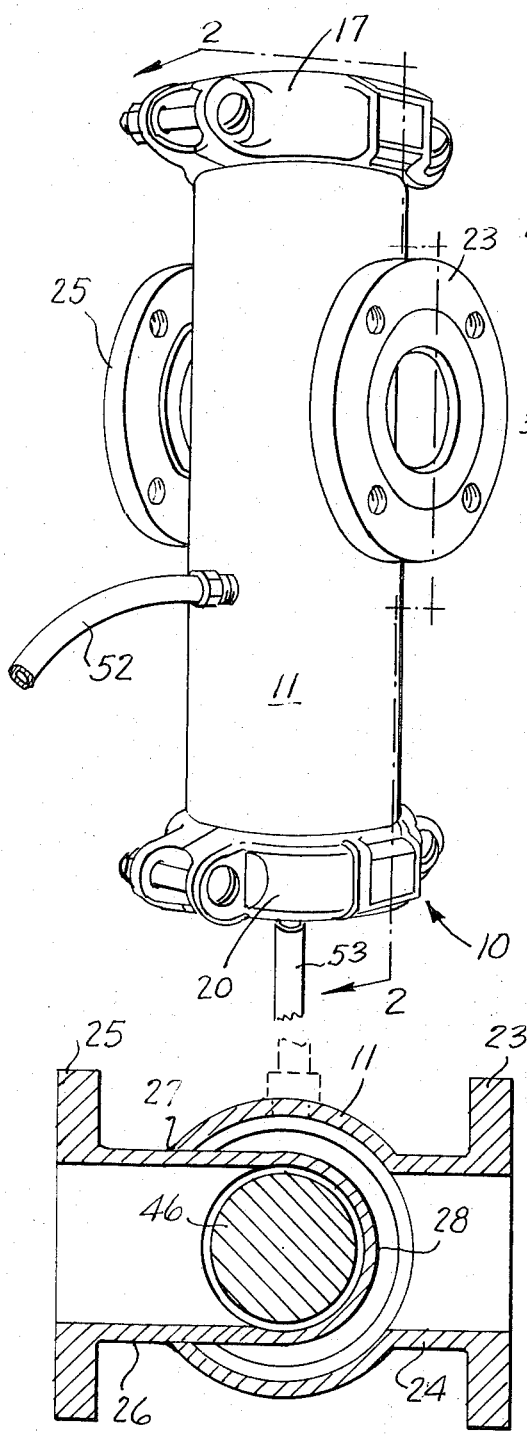
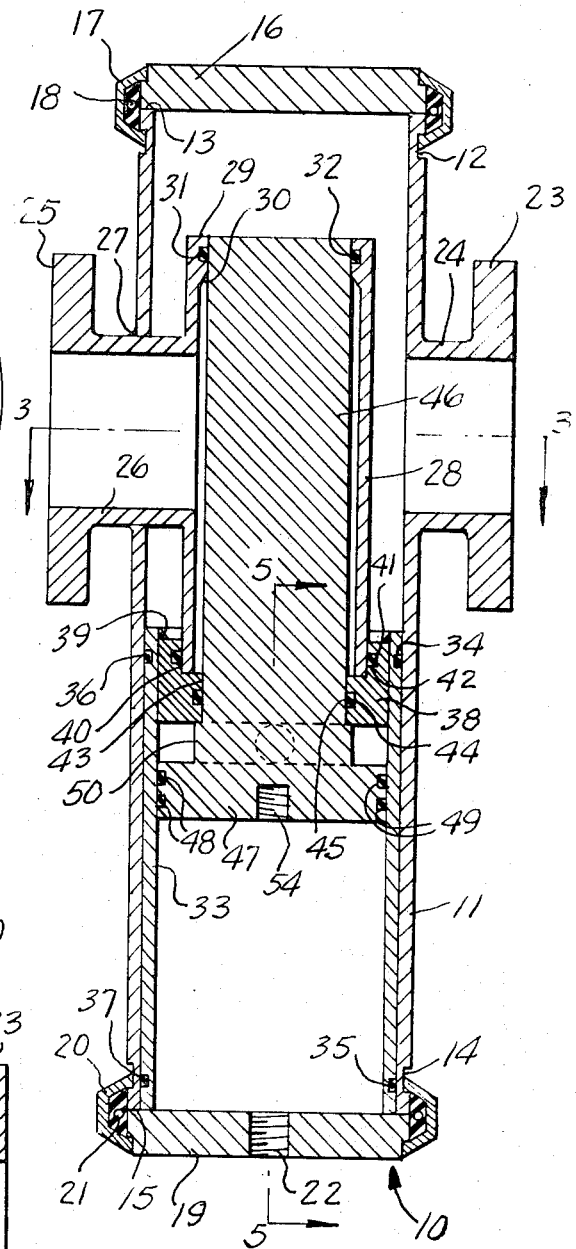

PATENTED DEC 11 1973 3,778,022

VALVE

BACKGROUND OF THE INVENTION

1. Field of the Invention

The present invention relates to piston valves and particularly to piston valves which seal at both ends of the piston travel.

2. Summary of the Invention

A cylindrical valve body is provided with pipe flanges on opposite sides thereof for connecting into a line with the opposite ends of the cylindrical body having removable caps to permit assembly and disassembly of the valve. A smaller cylinder axially positioned within the cylindrical body is connected to one of the line couplers on one side thereof so that the pipe flow will be through the side of the smaller cylinder and out one end thereof before flowing through the other coupling into the pipeline. A piston plug is slidably mounted in the smaller cylinder for engagement with a seal at the outlet end to seal off the flow through the valve. The opposite end of the piston plug is sealed to prevent leakage as it reciprocates. A cylindrical sleeve is mounted in the valve body and has a piston slidably mounted therein with this piston connected to the piston plug. Pressure is applied to opposite sides of the latter piston to cause it to reciprocate.

In a modified form of the invention pressure is applied to one side and a spring is used for the return. In another modified form of the invention a rod is connected to the piston plug to permit it to be reciprocated by hand.

The primary object of the invention is to provide a valve in which all working parts and wear surfaces can be removed from the valve body without disconnecting the valve body from the line being controlled.

Other objects and advantages will become apparent in the following specification when considered in the light of the attached drawings:

BRIEF DESCRIPTION OF THE DRAWINGS

FIG. 1 is a perspective view of the invention;

FIG. 2 is an enlarged vertical sectional view taken along the line 2—2 of FIG. 1 looking in the direction of the arrows;

FIG. 3 is a horizontal sectional view taken along the line 3—3 of FIG. 2, looking in the direction of the arrows;

Referring now to the drawings in detail wherein like reference characters indicate like parts throughout the several Figures, the reference numeral 10 indicates generally a valve constructed in accordance with the invention.

Figure 4:
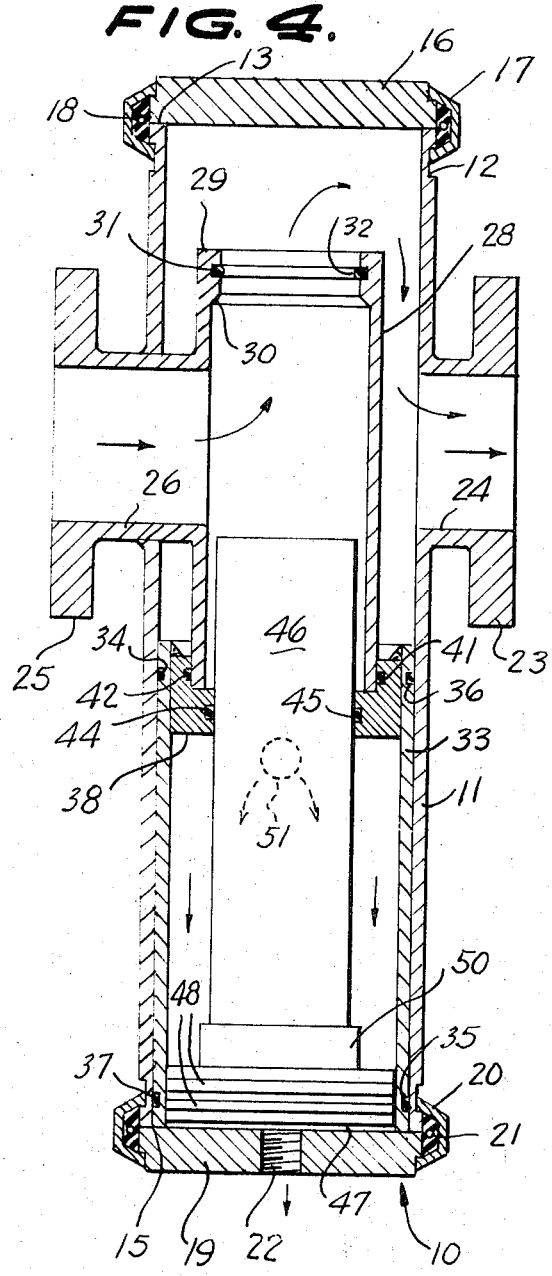
FIG. 4 is a view similar to FIG. 2, showing the valve in open position.
Figure 5:
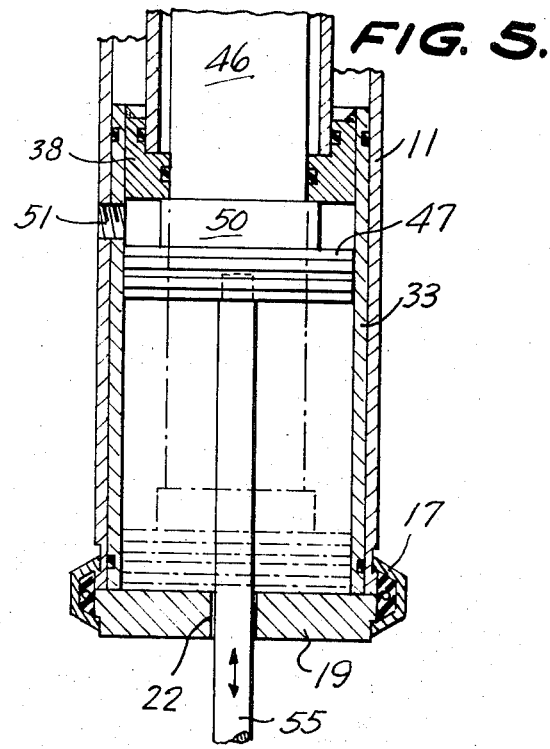
FIg. 5 is a fragmentary sectional view similar to FIG. 2, illustrating a modified form of the invention.

The valve 10 includes a cylindrical body 11 having an annular groove 12 formed in its outer surface adjacent the upper end 13 thereof. An annular groove 14 is formed in the outer surface of the cylindrical body 11 adjacent its lower end 15. A circular end cap 16 is secured against the upper end 13 of the body 11 by means of a split clamp ring 17 and seal 18.

A circular cap plate 19 is secured to the lower end 15 of the body 11 by means of a split clamp ring 20 and seal 21. The clamp ring 17 engages in the annular groove 12, and the clamp ring 20 engages in the annular groove 14, as can be clearly seen in FIG. 2. The cap plate 19 has an annular threaded bore 22 extending therethrough.

A pipe flange 23 is secured to one side of the body 11 by means of a nipple 24 and communicates with the interior of the body 11. A second pipe flange 25 is axially aligned with the pipe flange 23 and is mounted on a nipple 26 which extends through and is welded to the body 11 at 27. A valve seat cylinder 28 is axially aligned with the body 11 and is arranged between the pipe flanges 25,23. The nipple 26 has its inner end connected to the valve seat cylinder 28 communicating with the interior thereof.

The upper end 29 of the valve seat cylinder 28 has an internally reduced diameter portion 30 with a sealing groove 31 extending annularly thereabout. An O-ring seal 32 is seated in the annular sealing groove 31 for reasons to be assigned.

A cylindrical sleeve 33 is positioned in the cylindrical body 11 and has annular sealing grooves 34,35 adjacent its upper and lower ends, respectively. O-rings 36,37 are mounted in the sealing grooves 34,35 and are adapted to engage the inner surface of the cylindrical body 11 to seal the cylindrical sleeve 33 thereto.

A generally cylindrical collar 38 is secured to the sleeve 33 by welding 39. The collar 38 has a large axial bore 40 extending downwardly therein with an annular groove 41 extending thereabout. A sealing O-ring 42 is seated in the groove 41 for sealing engagement with the outer face of the lower end of the valve seat cylinder 28.

An axial bore 43 communicates with the lower end of the axial bore 40 and opens through the lower end of the collar 38. An annular groove 44 is formed in the bore 43 to receive a sealing O-ring 45 seated therein.

An elongate cylindrical valve piston 46 is mounted for reciprocation in the valve seat cylinder 28 and is adapted for sealing engagement with the O-ring 32 when at its uppermost point. The piston 46 has sealing engagement with the O-ring 45 at all times during its operation.

a piston head 47 is integrally formed with the piston 46 and has a diameter slightly smaller than the cylindrical sleeve 33. Annular sealing grooves 48 are formed in the piston head 47 and a pair of O-ring seals 49 are seated therein for sealing the piston head 47 against the sleeve 33. The piston valve 46 and the piston head 47 are connected by a cylindrical portion 50 having a diameter slightly greater than the piston valve 46 and smaller than the piston head 47.

The cylindrical portion 50 is adapted to engage the collar 38 to prevent the piston head 47 from coming into contact therewith.

A threaded bore 51 opens through the bore 11 and the cylindrical sleeve 33, closely adjacent the collar 38, to permit a pneumatic or hydraulic hose 52 to be connected thereto. A second hydraulic or pneumatic hose 53 is connected to the threaded bore 22 in the end cap 19.

In the use and operation of the invention the flanges 23,25 are conventionally connected into a pipeline so that the cylindrical body 11 extends transversely thereacross. Hydraulic or pneumatic pressure supplied through the hose 52 will force the piston head 47 downwardly in the cylindrical sleeve 33 to move the valve piston 46 downwardly and permit a flow through the nipple 26 into the cylinder 28 and out the top into the cylinder 11 and thence into the nipple 24 and back to the pipeline. When it is desired to close the valve, pressure is applied through the hose 53 and forces the piston head 47 upwardly in the sleeve 33 so that the piston valve 46 moves upwardly and engages the O-ring seal 32 to prevent the flow of fluid thereby. The O-ring seal 45 prevents leakage past the piston 46 downwardly through the collar 38.

With the flow of fluid from left to right, as viewed in FIG. 2, there is no pressure on the valve piston 46 in a direction to open the valve when it is in closed position and hence, it is not necessary to maintain an operating pressure on the hose 53.

A threaded bore 54 extends axially into the lower end of the piston head 47 to receive an operating rod 55 which is adapted to be threaded therein.

In the event that it is necessary to actuate the valve 10 during a period in which neither pneumatic nor hydraulic pressure is available, the hoses 52 and 53 can be disconnected and a rod 55 inserted through the threaded bore 22 and threaded into the threaded bore 54 to be grasped by hand to move the valve as desired.

Figure 6:
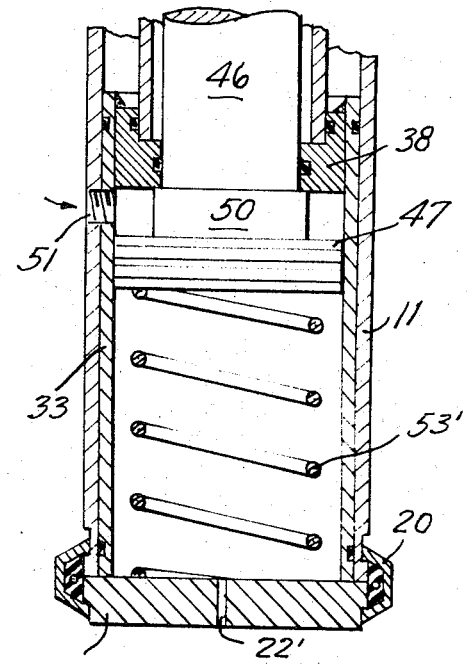
FIG. 6 is a view similar to FIG. 5, illustrating another modified form of the invention.

In FIG. 6 a modified form of the invention is illustrated wherein an end cap 19' is secured to the lower end of the body 11 by means of the split clamp 20. A vent bore 22' extends through the cap 19' for reasons to be assigned. A coil spring 53' is positioned within the cylindrical sleeve 33 engaging at one end the end cap 19' and the other end the piston head 47.

In the use and operation of the invention as modified in FIG. 6, a pneumatic or hydraulic hose is connected to the threaded bores 51 to supply pressure to the top of the piston head 47 so as to compress the spring 53' as the piston head 47 moves downwardly in the sleeve 33. The vent 22' permits air to flow to the space below the piston head 47 to prevent the locking up of the piston head 47. Since the piston valve 46 is in closed position with the piston head 47 at its uppermost point it can be clearly seen that should the pneumatic or hydraulic pressure fail, the spring 53' will maintain the valve 46 in closed position.

Having thus described the preferred embodiments of the invention, it should be understood that numerous structural modifications and adaptations may be resorted to without departing from the spirit of the invention.

I claim:

1. A line valve including a generally cylindrical body, means on opposite sides of said body for connecting said body into a line to be controlled, a cylinder having a diameter substantially less than that of said body mounted axially within said body and communicating with the means on one side of said body for connecting said body to a line, said cylinder having an internally reduced diameter portion at its upper end with an inwardly opening annular groove formed in said portion, a piston valve slidably mounted in said cylinder, said piston valve having a diameter substantially less than the diameter of said cylinder and less than the diameter of said portion, means in said groove for sealing the upper end of said piston valve to said portion, means at the lower end of said cylinder for sealing said piston valve thereto, a piston head secured to said piston valve and having a diameter substantially larger than the diameter of said piston valve, a sleeve mounted in said body with said piston head arranged for reciprocation therein, means for moving said piston head in said sleeve to Open and close said piston valve with respect to the upper sealed end of said cylinder, an end cap detachably secured to the upper end of said body to close said body and provide access for replacement of said means for sealing the upper end of said piston valve without removal of said piston valve from said valve, and an end cap detachably secured to the lower end of said bodY to close said body and provide access for servicing said piston valve and said sleeve.

2. A device as claimed in claim 1, wherein said sleeve is sealed to said body and can be removed from said body with said end cap detached.

3. A device as claimed in claim 1, wherein the means for moving said piston in said sleeve includes hoses for connecting the space at the opposite ends oF said piston head with a source of fluid under pressure.

4. A device as claimed in claim 1, wherein the means for moving said piston head in said sleeve includes a hose connecting the space at one end of said piston head with a source of fluid under pressure, and a coil spring engaging the opposite face of said piston head to move said piston head and said piston valve in the opposite direction.

5. A device as claimed in claim 1, in which the means for moving said piston head in said sleeve includes a hand operated rod detachably secured to said piston head and extending outwardly of said body.

6. A deVice as claimed in claim 1, wherein the means sealing the lower end of said piston valve includes a collar secured to the upper end of said sleeve and having a seal mounted in said collar.

7. A valve as claimed in claim 1, wherein said cylinder and said means on one side of said body for connecting said body to a line and communicating with said cylinder are integrally formed as a tee.

* * * * *